(12) United States Patent
Gassmann (10) Patent No.: US 10,962,096 B2
(45) Date of Patent: Mar. 30, 2021

(54) LOCKABLE DIFFERENTIAL TRANSMISSION

(71) Applicant: GKN Automotive Ltd., Redditch (GB)

(72) Inventor: Theodor Gassmann, Siegburg (DE)

(73) Assignee: GKN Automotive Ltd., Redditch (GB)

( * ) Notice: Subject to any disclaimer, the term of this patent is extended or adjusted under 35 U.S.C. 154(b) by 94 days.

(21) Appl. No.: 16/316,630

(22) PCT Filed: Jul. 14, 2016

(86) PCT No.: PCT/EP2016/066778
§ 371 (c)(1),
(2) Date: Jan. 10, 2019

(87) PCT Pub. No.: WO2018/010798
PCT Pub. Date: Jan. 18, 2018

(65) Prior Publication Data
US 2019/0226565 A1 Jul. 25, 2019

(51) Int. Cl.
*F16H 48/22* (2006.01)
*F16H 48/14* (2006.01)
*F16H 48/19* (2012.01)

(52) U.S. Cl.
CPC .......... *F16H 48/22* (2013.01); *F16H 48/145* (2013.01); *F16H 48/147* (2013.01); *F16H 48/19* (2013.01)

(58) Field of Classification Search
CPC .......... F16H 48/22; F16H 48/19; F16H 48/20; F16H 48/145; F16H 48/147; F16H 48/24; F16H 48/27
See application file for complete search history.

(56) References Cited

U.S. PATENT DOCUMENTS 5,183,445 A * 2/1993 Alt .................. B60K 17/16
188/82.84
5,845,546 A * 12/1998 Knowles ............ B60K 23/04
74/650

(Continued)

FOREIGN PATENT DOCUMENTS

EP 0414086 A2 2/1991
WO 2010104853 A2 9/2010

OTHER PUBLICATIONS

International Search Report and Written Opinion for PCT/EP2016/066778 dated Mar. 24, 2017 (13 pages; with English translation).

*Primary Examiner* — David R Morris
*Assistant Examiner* — Lori Wu
(74) *Attorney, Agent, or Firm* — Bejin Bieneman PLC (57) ABSTRACT

A differential transmission for transmitting a torque to an axle of a motor vehicle, has at least one driveshaft and at least one output shaft, which are connectable in torque-transmitting manner via a clutch within a housing of the differential transmission, wherein the clutch is actuatable via an actuating device, wherein the actuating device is mounted on the housing, wherein the at least one output shaft is mounted in a rotatable manner via a bearing, wherein the bearing is mounted on the actuating device; wherein a stop is arranged on the at least one output shaft such that an actuating force that is provided for actuating the clutch and acts at least in an axial direction is supported on the stop at least via the actuating device and the bearing.

12 Claims, 4 Drawing Sheets

(56) References Cited

U.S. PATENT DOCUMENTS

2006/0014601 A1* 1/2006 Kelley, Jr. .............. B60K 17/16
188/82.84
2006/0052207 A1* 3/2006 Teraoka ................ B60K 23/04
74/650
2016/0160980 A1 6/2016 Imamori et al.

* cited by examiner

LOCKABLE DIFFERENTIAL TRANSMISSION

CROSS-REFERENCE TO RELATED APPLICATIONS

This application is a national stage of, and claims priority to, Patent Cooperation Treaty Application No. PCT/EP2016/066778, filed on Jul. 14, 2016, which application is hereby incorporated herein by reference in its entirety.

BACKGROUND

Via the differential transmission, a torque is usually transmitted from a vehicle drive unit into a differential transmission via an input shaft (for example via a longitudinal shaft). Within the differential transmission, this torque is transmitted to the wheels of the axle, wherein different speeds of the wheels can be equalized in the differential transmission and also a potentially different distribution of the torque to the wheels is intended to take place.

The input shaft transmits the torque to the output shaft via the at least one driveshaft and thus to the respective wheel of the axle. Via the clutch, the respective output shaft can be coupled to the driveshaft and thus to the input shaft. The clutch is actuated via an actuating device. With the differential transmission locked, at least one driveshaft is rigidly connected to the corresponding output shaft.

EP 0 414 086 A2 discloses such a differential transmission. Said document proposes supporting the actuating force required to actuate the clutch on a shaft or on a differential cage, such that the transmission housing of the differential transmission remains free of load. In this way, influences on the toothing ratios and on the bearing load can be reduced.

There is a constant need to improve components of motor vehicles. In particular, the components are desired to become lighter and more compact and in the process as cost-effective to produce as possible.

SUMMARY

The present disclosure relates to a lockable differential transmission for transmitting a torque to an axle of a motor vehicle, having at least one driveshaft and at least one output shaft, which are connectable in torque-transmitting manner via a clutch within a housing of the differential transmission. The differential transmission advantageously provides reduced weight and overall size and/or has a simpler structure.

A differential transmission according to the features of the independent claim can achieve these advantages. Advantageous embodiments are the subject matter of the dependent claims. The features presented individually in the claims are combinable with one another in a technologically meaningful manner and can be supplemented by explanatory matter from the description and details from the figures, giving rise to further variant embodiments of the invention.

A (lockable) differential transmission for transmitting a torque to an axle of a motor vehicle has at least one driveshaft and at least one output shaft, which are connectable in torque-transmitting manner via a clutch within a housing of the differential transmission. The clutch is actuatable via an actuating device, wherein the actuating device is mounted on the housing. The at least one output shaft is mounted in a rotatable manner via a bearing, for example a rolling bearing, wherein the bearing is mounted on the actuating device. A stop is arranged on the at least one output shaft such that an actuating force that is provided for actuating the clutch and acts at least in an axial direction is supported on the stop at least via the actuating device and the bearing.

In particular, driveshafts, output shafts, clutches, bearings and stop are arranged (fully) within the housing of the differential transmission. Optionally, only the output shafts extend outward via openings in the housing.

Preferably, the housing is embodied in a multipart manner and forms an interior space for the components presented above, in which sufficient lubrication of the components can be ensured. The housing is thus preferably sealed off from the outside by seals, such that a lubricant remains within the housing.

The term "housing" used here relates in each case at least to the part of the housing (optionally embodied in a multipart manner) on which the actuating device is mounted.

EP 0 414 086 A2 discloses an actuating device having two expansion disks which are supported via balls in the axial direction. Twisting of the expansion disks in the circumferential direction with respect to one another causes a change in the position of an expansion disk in the axial direction, since the balls are arranged on ramps. The expansion disks are both arranged on the shaft, wherein the actuating forces are absorbed on one side by a disk axially secured to the shaft and on the other side by the differential cage. The shaft is mounted on the transmission housing via a rolling bearing.

Here, it is now disclosed that the bearing is mounted on the actuating device (and not on the housing). Furthermore, the actuating device is mounted on the housing (and not on the output shaft). Preferably, it is thus possible to arrange the bearing and actuating device at least in an overlapping manner and optionally additionally coaxially in the axial direction. In particular, the bearing is thus arranged for example in a radial direction within the actuating device. In this way, a more compact design of the differential transmission is possible.

In particular, the bearing is supported on the actuating device. Preferably, the bearing is arranged directly adjacent to the actuating device. In particular, forces (originating for example from the output shafts during operation of the differential transmission) in the radial direction are transmitted only from the bearing to the actuating device. In particular, actuating forces in the axial direction are transmitted by the actuating device mainly or only to the bearing.

The actuating device is arranged on the housing. The actuating forces necessary for actuating the clutch are absorbed only to a minor extent, preferably not at all, by the housing, however. In particular, at most 20% of the maximum actuating force is introduced into the housing. Preferably, the actuating force is supported on the stop via the bearing such that the housing is free of load.

In particular, only positioning of the actuating device in the radial direction takes place via the housing, wherein there is a clearance between the housing and actuating device in the axial direction.

Starting from the actuating device, the actuating forces are introduced into the clutch on one side and into the output shaft vie the bearing and the stop on the other side.

Any deformation of the housing as a result of the actuating forces can thus be prevented. In this way, however, close tolerances can be ensured within the differential transmission even during operation and over the lifetime, such that ever-precise control of the clutch and thus precise setting of the torques to be transmitted can occur.

Preferably, the housing includes a nonmetal material, in particular of a plastic. Alternatively, it is possible to use a metal material, in which case the housing can be embodied in a thinner-walled manner, however. Both measures allow a considerable weight saving of the housing.

According to a preferred embodiment, the bearing is a rolling bearing and comprises an inner ring and an outer ring (and rolling elements, for example, balls, arranged in between), wherein the inner ring is arranged on the at least one output shaft and on the stop, and the outer ring is arranged on the actuating device.

In particular, the actuating forces are thus conducted, starting from the actuating device, via the outer ring to the rolling elements, from the rolling elements to the inner ring, and from the inner ring to the stop.

Preferably, the stop is formed by a supporting ring which is arranged, for example in a groove, on the output shaft in a form-fitting manner in the axial direction. The supporting ring is, for example, a spring ring, which, in the expanded state, can be pushed onto the output shaft and is thus arrangeable for example in an (optionally encircling) groove.

In particular, the actuating device comprises two expansions disks that are twistable in a circumferential direction with respect to one another, wherein at least a first expansion disk is mounted on the housing and includes at least partly a metal material.

In particular, the first expansion disk is positioned over the housing only in the radial direction, wherein there is a clearance between the housing and first expansion disk in the axial direction.

The first expansion disk and bearing are preferably connected together such that an actuating force acting at least in the axial direction can be introduced into the bearing by the expansion disk.

Another embodiment proposes that, in order to actuate the clutch, the actuating device has at least one piston that is displaceable in the axial direction in at least one cylinder, wherein the at least one cylinder is mounted on the housing and consists at least partially of a metal material.

The actuating force is conducted through the actuating device preferably to the greatest extent (in particular only) through the metal components of the actuating device.

In particular, the clutch is a multiplate clutch having a plurality of outer plates and a plurality of inner plates. The clutch can also be embodied as a friction clutch having a pressure plate, a clutch disk, and a counterplate, however, wherein the pressure plate and counterplate are connected for conjoint rotation, for example to the output shaft, and the clutch disk is connected for conjoint rotation to the drive shaft. The pressure plate is in this case arranged so as to be displaceable in the axial direction, wherein the clutch disk is arranged between the pressure plate and counterplate. The clutch is thus not limited to a particular embodiment. However, partial transmission of a torque from the driveshaft to the output shaft via the clutch should preferably also be allowed.

In particular, the differential transmission has two output shafts, which are connectable to the at least one driveshaft in a torque-transmitting manner via a respective clutch. In particular, a torque is introduced into the differential transmission via an input shaft. Via a toothing, the torque is transmitted from the input shaft to a driveshaft which is connectable to an output shaft at mutually opposite ends via a respective clutch. Via these two clutches, it is thus possible for different speeds of the output shafts to be allowed and furthermore a desired distribution of the torque to the output shafts to be set.

According to another embodiment, the differential transmission has two output shafts, wherein only one output shaft is connectable to the at least one driveshaft in a torque-transmitting manner via a clutch. In this case, the differential transmission thus has only one clutch, wherein the two output shafts are coupled together in order to equalize potentially different speeds via a differential, for example, via a bevel gear differential transmission or a planetary differential transmission. In the case of the bevel gear differential transmission, the differential cage, for example, forms a first driveshaft, which is directly connected to the input shaft, for example via a toothing.

Also disclosed is a drive arrangement for a motor vehicle, at least comprising a drive unit and a differential transmission according to the invention, wherein the differential transmission is provided to transmit a torque from the drive unit to two wheels of an axle, wherein the torque is introducible into the differential transmission via an input shaft and the at least one driveshaft is connected to the input shaft in a torque-transmitting manner directly via a toothing or via a differential.

According to a preferred embodiment, a first driveshaft, for example is embodied as a differential cage of the differential.

The statements made with regard to the differential transmission apply equally to the drive arrangement and vice versa.

Also disclosed is a motor vehicle which has at least one above-specified drive arrangement and a plurality of wheels, wherein the differential transmission is arranged preferably on a rear axle of the motor vehicle.

SUMMARY OF THE DRAWINGS

The invention and the technical field are explained in more detail in the following text on the basis of the figures. It should be noted that the invention is not intended to be limited by the exemplary embodiments shown. In particular, it is also possible, unless explicitly stated otherwise, to extract partial aspects of the substantive matter explained in the figures and to combine them with other constituents and findings from the present description and/or figures. Identical reference signs denote identical objects, and so explanations from other figures can be used in a supplementary manner, where appropriate. In the figures, in each case schematically.

DESCRIPTION

Figure 1:
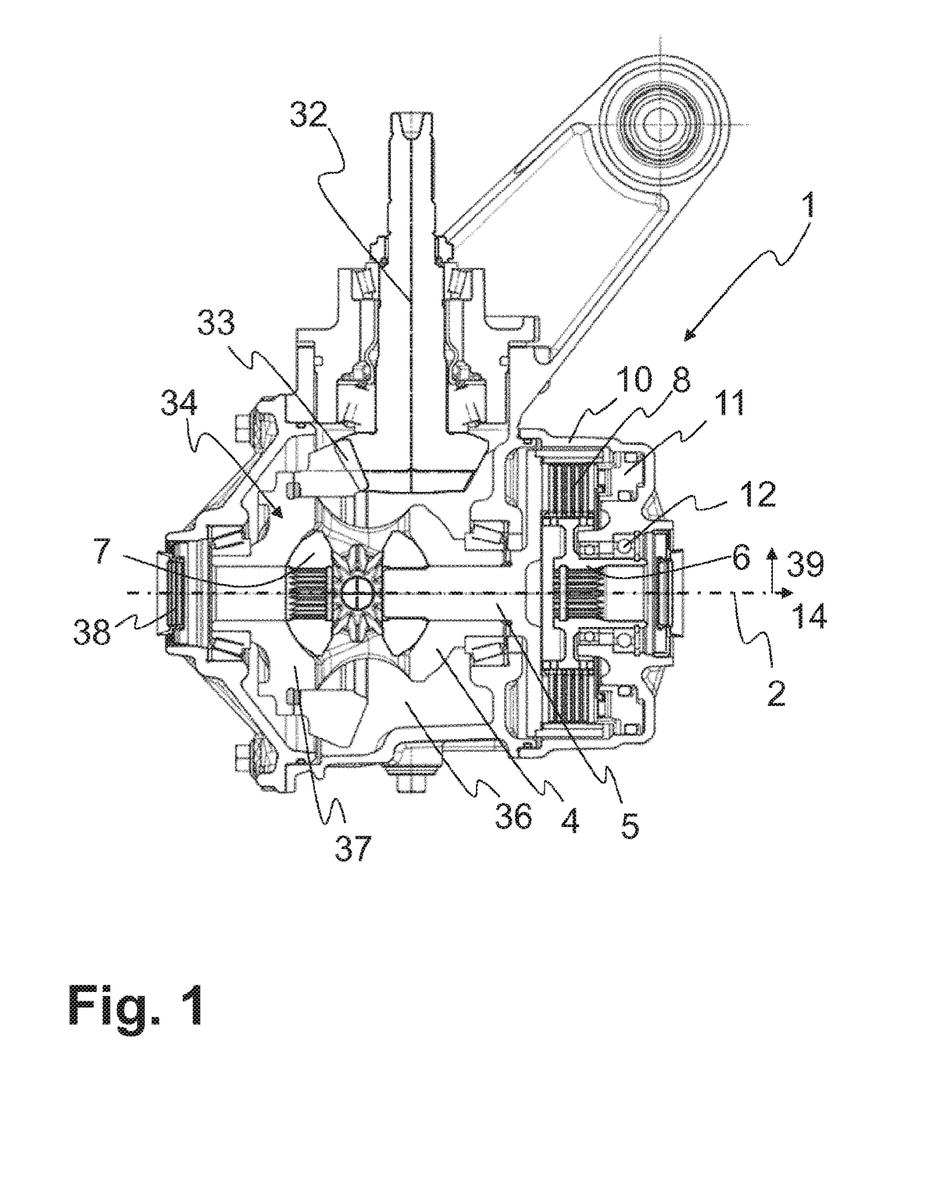
FIG. 1: shows a side view in cross section of a differential transmission having a clutch.

FIG. 1 shows a side view in cross section of a differential transmission 1 having a clutch 8. Here, the differential transmission 1 has a first output shaft 6 and a second output shaft 7, wherein only the first output shaft 6 is connectable in a torque-transmitting manner to the (second) driveshaft 5 via a (first) clutch 8. In this case, the differential transmission 1 thus has only one clutch 8, wherein the two output shafts 6, 7 are coupled together to equalize potentially different speeds via a differential 34, in this case via a bevel gear differential transmission, wherein the differential cage 37 forms the first driveshaft 4, which is directly connected to the input shaft 32 via a toothing 33.

The clutch 8 is actuated via an actuating device 11, which is arranged on the housing 10 of the differential transmission 1 and is mounted there. Actuating forces 15 (not shown here) of the actuating device 11 are introduced into the housing 10 directly by the actuating device 11.

Here, the housing 10 is embodied in a multipart manner and forms an interior space 36 for the following components: first driveshaft 4, second driveshaft 5, output shafts 6, 7, clutch 8, bearing 12, and actuating device 11, which are thus arranged within the housing 10. The output shafts 6, 7 are in this case each embodied as hollow shafts having an inwardly directed spline toothing. Via the spline toothings, further output shafts are connected for conjoint rotation to the output shafts 6, 7, wherein the further output shafts then extend outward (not shown here) via the openings 38 in the housing 10.

The housing 10 is sealed off from the outside via seals, such that a lubricant is retained inside the housing 10 and thus sufficient lubrication of the components in the interior space 36 is ensured.

The clutch 8 is embodied here as a multiplate clutch having a plurality of outer plates 27 and a plurality of inner plates 28, which are connectable together in a frictional manner via the actuating device 11.

Figure 2:
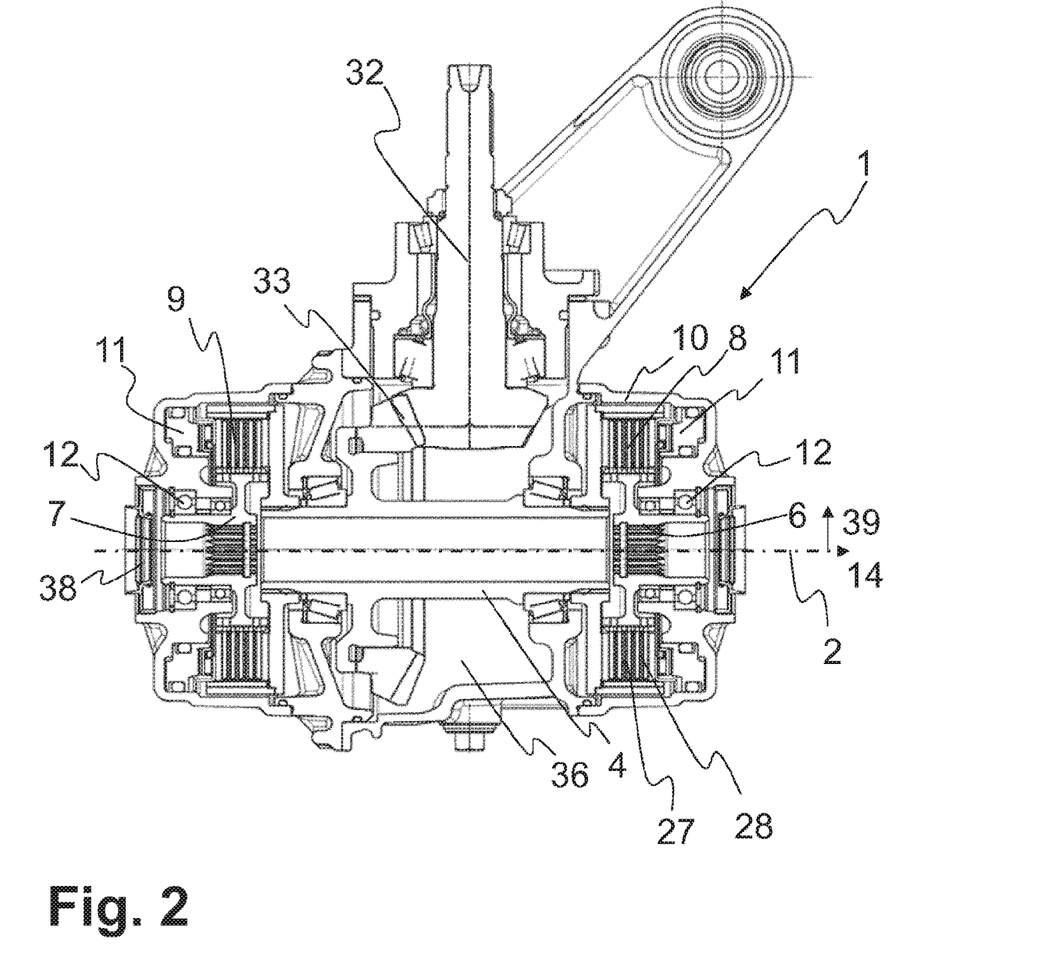
FIG. 2: shows a side view in cross section of a differential transmission having two clutches.

FIG. 2 shows a side view in cross section of a differential transmission 1 having two clutches 8, 9. Here, the differential transmission 1 has a first output shaft 6 and a second output shaft 7, which are connectable in a torque-transmitting manner to the one first driveshaft 4 via a respective clutch 8, 9. A torque is introduced into the differential transmission 1 via the input shaft 32 and transmitted from the input shaft 32 to the first driveshaft 4 via a toothing 33. The first driveshaft 4 is connectable at mutually opposite ends to an output shaft 6, 7 via a respective clutch 8, 9. Via these two clutches 8, 9 a different speed of the output shafts 6, 7 can be allowed and furthermore a desired distribution of the torque to the output shafts 6, 7 can be set.

The clutches 8, 9 are actuated via actuating devices 11, which are arranged on the housing 10 of the differential transmission 1 and are mounted there. Actuating forces 15 (not shown here) of the actuating devices 11 are introduced into the housing 10 directly by the respective actuating device 11.

The clutches 8, 9 are embodied as multiplate clutches having a plurality of outer plates 27 and a plurality of inner plates 28. The outer plates 27 are connected for conjoint rotation to the first driveshaft 4 via an outer plate carrier. The inner plates 28 of the first clutch 8 are connected to the first output shaft 6 via an inner plate carrier and the inner plates 28 of the second clutch 8 are connected to the second output shaft 7 via an inner plate carrier.

Reference is made to the statements given with respect to FIG. 1.

Figure 3:
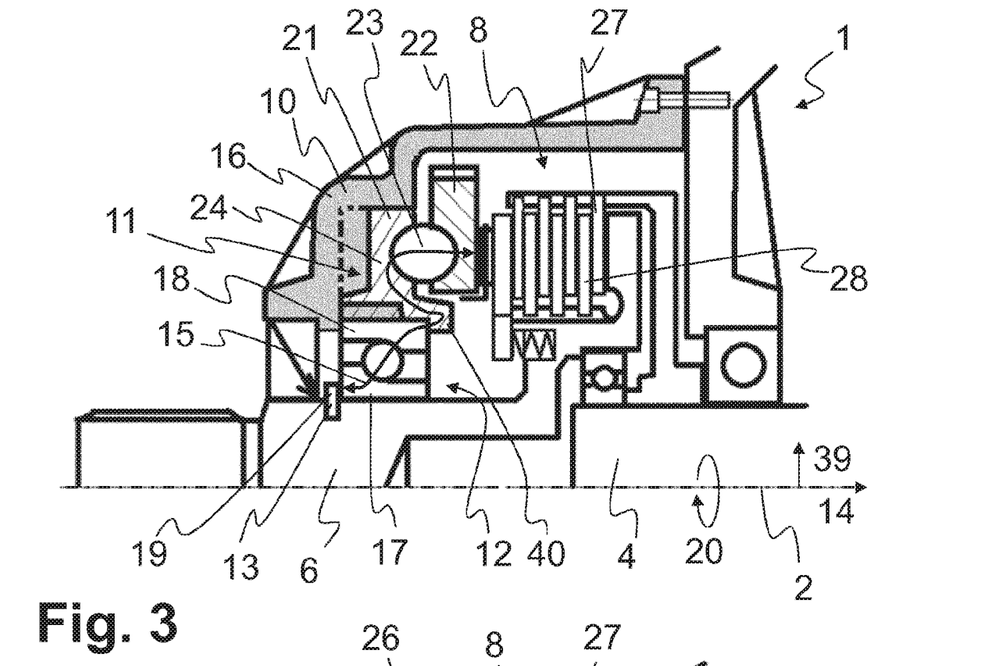
FIG. 3: shows a side view in cross section of a detail of a first variant embodiment of a differential transmission.

FIG. 3 shows a side view in cross section of a detail of a first variant embodiment of a differential transmission 1. By way of the differential transmission 1, a torque is transmitted from an input shaft 32 to an axle 2 of a motor vehicle 3. The differential transmission 1 comprises in this case a first driveshaft 4 and a first output shaft 6, which are connectable in a torque-transmitting manner via a first clutch 8 within the housing 10 of the differential transmission 1. The first clutch 8 is actuatable via an actuating device 11, wherein the actuating device 11 is mounted on the housing 10. The first output shaft 6 is mounted in a rotatable manner via a bearing 12, wherein the bearing 12 is mounted on the actuating device 11. A stop 13 is arranged on the first output shaft 6 such that an actuating force 15 that is provided for actuating the first clutch 8 and acts at least in the axial direction 14 is supported on the stop 13 at least via the actuating device 11 and the bearing 12.

Here, the actuating device 11 comprises a first expansion disk 21 and a second expansion disk 22, which are supported in the axial direction 14 via balls (rolling elements 23). Twisting of the expansion disks 21, 22 in the circumferential direction 20 with respect to one another causes a change in the position of the second expansion disk 22 in the axial direction 14, since the balls (rolling elements 23) are arranged on ramps.

Here, the bearing 12 is mounted on the actuating device 11 (and not on the housing 10). Furthermore, the actuating device 11 is mounted on the housing 10 (and not on the first output shaft 6). Thus, it is possible to arrange the bearing 12 and actuating device 11 at least in an overlapping manner in the axial direction 14. Here, the bearing 12 is thus arranged within the actuating device 11 and coaxially with the actuating device 11 in a radial direction 39. In this way, a more compact design of the differential transmission 1 is possible.

The actuating device 11 is arranged on the housing 10. The actuating forces 15 necessary for actuating the first clutch 8 are absorbed only to a minor extent, preferably not at all, by the housing 10. Here, only positioning of the actuating device 11 in the radial direction 39 takes place via the housing 10, wherein there is a clearance between the housing and 10 and actuating device 11 in the axial direction 14.

Starting from the actuating device 11, the actuating forces 15 are introduced into the first clutch 8 (and via the first clutch 8 into the first driveshaft 4) on one side and into the first output shaft 6 via the bearing 12 and the stop 13 on the other side.

Any deformation of the housing 10 as a result of the actuating forces 15 can thus be prevented. In this way, however, close tolerances can be ensured within the differential transmission 1 even during operation and over the lifetime, such that ever-precise control of the clutch 8 and thus precise setting of the torques to be transmitted can occur.

Here, the housing 10 consists of a nonmetal material 16, in particular of a plastic.

Here, the bearing 12 is a rolling bearing and comprises an inner ring 17 and an outer ring 18 (and rolling elements, for example balls, arranged in between), wherein the inner ring 17 is arranged on the first output shaft 6 and on the stop 13, and the outer ring 18 is arranged on the actuating device 11.

The actuating forces 15 are thus conducted from the actuating device 11 via the outer ring 18 to the rolling elements, from the rolling elements to the inner ring 17 and from the inner ring 17 to the stop 13.

The stop 13 is formed here by a supporting ring 19, which is arranged in a form-fitting manner in the axial direction 14 in a groove on the first output shaft 6.

Here, the actuating device 11 comprises two expansion disks 21, 22 that are twistable in a circumferential direction 20 with respect to one another, wherein the first expansion disk 21 is mounted on the housing 10 and includes at least partly a metal material 24 (for example comprising a metal alloy or for sintering purposes inter alia produced from a metal powder).

The first expansion disk 21 and the bearing 12 are connected together such that the actuating force 15 acting at least in the axial direction 14 is introducible into the bearing 12 by the first expansion disk 21. The introduction takes place here via the overlap 40 of the first expansion disk 21 around the outer ring 18 of the bearing 12.

The conduction of the actuating force 15 by the actuating device 11 takes place here exclusively through the components of the actuating device 11 (namely the first expansion disk 21) made of metal material 24.

Here, the first clutch 8 is a multiplate clutch having a plurality of outer plates 27 and a plurality of inner plates 28, which, upon actuation of the clutch 8, are connectable together in a frictional manner and releasable again.

Figure 4:
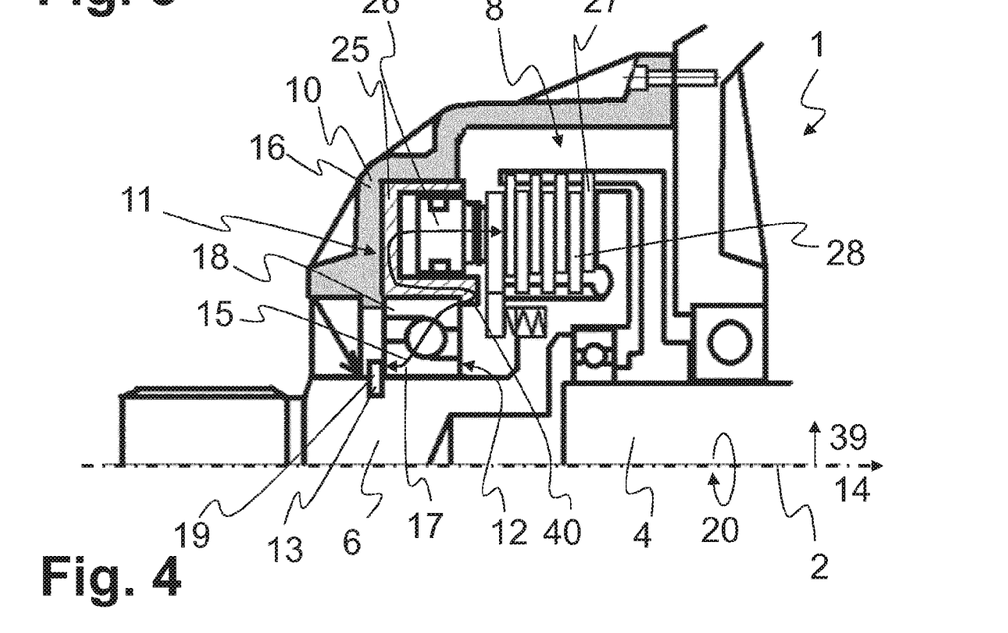
FIG. 4: shows a side view in cross section of a detail of a second variant embodiment of a differential transmission.

FIG. 4 shows a side view in cross section of a detail of a second variant embodiment of a differential transmission 1. Reference is made to the statements given with respect to FIG. 3. In contrast to the first variant embodiment, the actuating device 11 for actuating the first clutch 8 is embodied here with a piston 26 that is displaceable in the axial direction 14 in a cylinder 25, wherein the cylinder 25 is mounted on the housing 10 and consists at least partially of a metal material 24. Here, the cylinder 25 forms the overlap 40.

Figure 5:
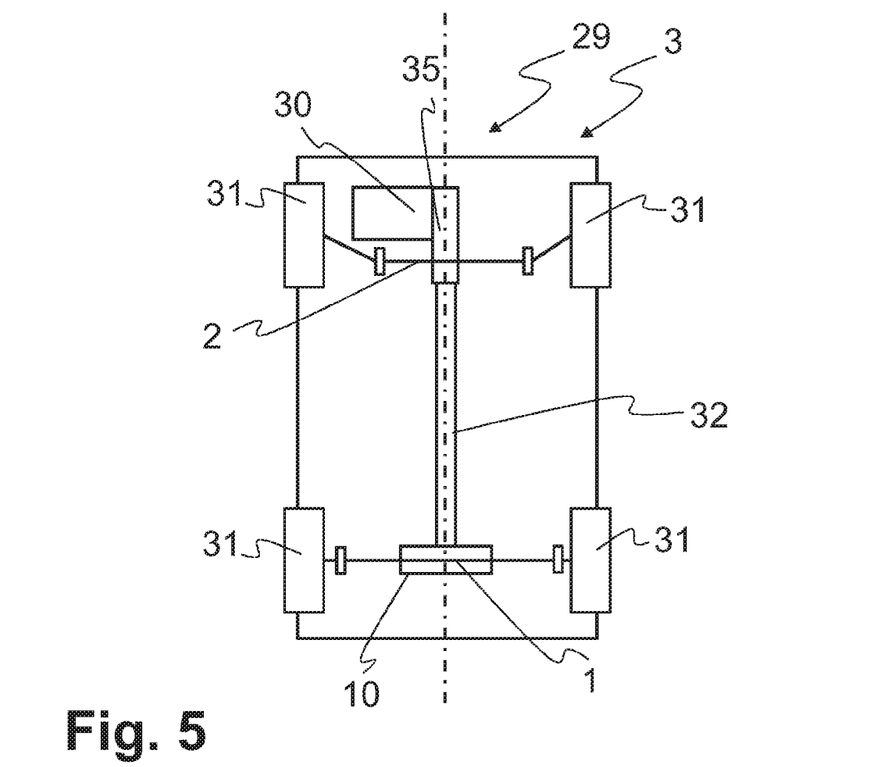
FIG. 5: shows a plan view of a motor vehicle having a drive arrangement.

FIG. 5 shows a plan view of a motor vehicle 3 having a drive arrangement 29. The drive arrangement 29 comprises a drive unit 30, a transmission 35 and an input shaft 32, embodied as a longitudinal shaft, for the differential transmission 1. The differential transmission 1 is provided to transmit a torque from the drive unit 30 to the two wheels 31 of an axle 2, wherein the torque is introducible into the differential transmission 1 via the input shaft 32. The motor vehicle 3 comprises at least the drive arrangement 29 and a plurality of wheels 31, wherein the differential transmission 1 is arranged preferably on a (rear) axle 2 of the motor vehicle 3.

LIST OF REFERENCE SIGNS

1 Differential transmission
2 Axle
3 Motor vehicle
4 First driveshaft
5 Second driveshaft
6 First output shaft
7 Second output shaft
8 First clutch
9 Second clutch
10 Housing
11 Actuating device
12 Bearing
13 Stop
14 Axial direction
15 Actuating force
16 Nonmetal material
17 Inner ring
18 Outer ring
19 Supporting ring
20 Circumferential direction
21 First expansion disk
22 Second expansion disk
23 Rolling element
24 Metal material
25 Cylinder
26 Piston
27 Outer plates
28 Inner plates
29 Drive arrangement
30 Drive unit
31 Wheel
32 Input shaft
33 Toothing
34 Differential
35 Transmission
36 Interior space
37 Differential cage
38 Opening
39 Radial direction
40 Overlap

The invention claimed is:

1. A differential transmission for transmitting a torque to an axle of a motor vehicle, comprising:
    at least one driveshaft and at least one output shaft that are connectable to transmit torque via a clutch within a housing of the differential transmission;
    wherein the clutch is actuatable via an actuating device,
    wherein the actuating device is mounted on the housing,
    wherein the at least one output shaft is mounted in a rotatable manner via a bearing,
    wherein the bearing is mounted on the actuating device,
    wherein a stop is arranged on the at least one output shaft such that an actuating force that is provided for actuating the clutch and acts at least in an axial direction is supported on the stop via at least the actuating device and the bearing; and
    wherein forces in a radial direction are transmitted from the bearing to the actuating device.

2. The differential transmission of claim 1, wherein the housing includes a nonmetal material.

3. The differential transmission of claim 2, wherein the actuating force is supported on the stop such that the housing is free of load.

4. The differential transmission of claim 1, wherein the bearing is a rolling bearing and comprises an inner ring and an outer ring, wherein the inner ring is arranged on the at least one output shaft and on the stop, and the outer ring is arranged on the actuating device.

5. The differential transmission of claim 1, wherein the stop is formed by a supporting ring which is arranged on the at least one output shaft in a form-fitting manner in the axial direction.

6. The differential transmission of claim 1, wherein the actuating device comprises two expansion disks that are twistable in a circumferential direction with respect to one another, wherein at least a first expansion disk is mounted on the housing and is at least partly a metal material.

7. The differential transmission of claim 1, wherein, in order to actuate the clutch, the actuating device has at least one piston that is displaceable in the axial direction in at least one cylinder, wherein the at least one cylinder is mounted on the housing and is at least partly a metal material.

8. The differential transmission of claim 1, wherein the clutch is a multiplate clutch having outer plates and inner plates.

9. The differential transmission of claim 1,
    wherein the differential transmission has two output shafts that are connectable to the at least one driveshaft to transmit torque via a respective clutch,
    wherein each clutch is actuatable via a respective actuating device,
    wherein the actuating devices are mounted on the housing, wherein each output shaft is mounted in the rotatable manner via a respective bearing, wherein each bearing is mounted on the respective actuating device, and wherein a respective stop is arranged on each output shaft such that the actuating force that is provided for actuating the clutch and acts at least in the axial direction is supported on the stop at least via the actuating device and the bearing.

10. The differential transmission of claim 1, wherein the differential transmission has two output shafts, wherein only one output shaft is connectable to the at least one driveshaft to transmit torque via the clutch.

11. The differential transmission of claim 1, wherein the forces in the radial direction are transmitted only from the bearing to the actuating device.

12. A drive arrangement for a motor vehicle, comprising: a drive unit and a differential transmission, wherein the differential transmission comprises:
   at least one driveshaft and at least one output shaft that are connectable to transmit torque via a clutch within a housing of the differential transmission;
   wherein the clutch is actuatable via an actuating device,
   wherein the actuating device is mounted on the housing,
   wherein the at least one output shaft is mounted in a rotatable manner via a bearing,
   wherein the bearing is mounted on the actuating device, and
   wherein a stop is arranged on the at least one output shaft such that an actuating force that is provided for actuating the clutch and acts at least in an axial direction is supported on the stop via at least the actuating device and the bearing; and
   wherein forces in a radial direction are transmitted from the bearing to the actuating device; and
wherein the differential transmission is provided to transmit a torque from the drive unit to two wheels of an axle, wherein the torque is introducible into the differential transmission via an input shaft and the at least one driveshaft is connected to the input shaft to transmit torque directly via a toothing or via a differential.

* * * * *